United States Patent [19]

DiFlora

[11] Patent Number: 5,168,960
[45] Date of Patent: Dec. 8, 1992

[54] COMPRESSOR CRANKSHAFT BEARING CAP AND ASSEMBLY

[75] Inventor: Michael A. DiFlora, Bristol, Tenn.

[73] Assignee: Bristol Compressors

[21] Appl. No.: 672,114

[22] Filed: Mar. 19, 1991

[51] Int. Cl.⁵ ............................................. F01M 1/10
[52] U.S. Cl. .................... 184/6.16; 184/6.18; 184/6.24; 417/368
[58] Field of Search ............. 184/6.5, 6.16, 6.18, 184/6.24, 6.27; 417/415, 902, 368

[56] References Cited

U.S. PATENT DOCUMENTS

| | | | |
|---|---|---|---|
| 2,752,088 | 6/1956 | Borgerd et al. | 417/902 |
| 2,883,101 | 4/1959 | Kosfeld | 184/6.18 |
| 3,008,629 | 11/1961 | Gerteis | 417/415 |
| 3,104,051 | 9/1963 | Henning et al. | 417/902 |
| 3,334,808 | 8/1967 | Parker et al. | 417/902 |
| 3,807,907 | 4/1974 | Gannaway | 417/415 |
| 4,174,927 | 11/1979 | Lindstrom | 417/902 |
| 4,406,594 | 9/1983 | Smaby et al. | 184/6.18 |
| 4,724,928 | 2/1988 | Lewis et al. | 184/6.18 |
| 4,907,951 | 3/1990 | Wisner | 417/368 |

Primary Examiner—Ira S. Lazarus
Assistant Examiner—Alan B. Cariaso

[57] ABSTRACT

A bearing cap for the gas compressor of a compressor unit in which oil is normally entrained with the refrigerant gas and recirculated therewith, the cap being adapted for mounting on the compressor block in substantial axial alignment with a crankshaft mounted therein, the cap body having a cavity therein formed by a wall providing both axial and lateral shoulders or bearings for containing the sump end portion of the crankshaft, a shelf on the body extending generally laterally outwardly therefrom and having a face oriented generally transverse to the axis of the cavity, pockets formed in the face and adapted to catch and retain sediment, and one or more ports extending from the face through the shelf and adapted to drain oil from the crankcase to the sump of a compressor unit.

27 Claims, 2 Drawing Sheets

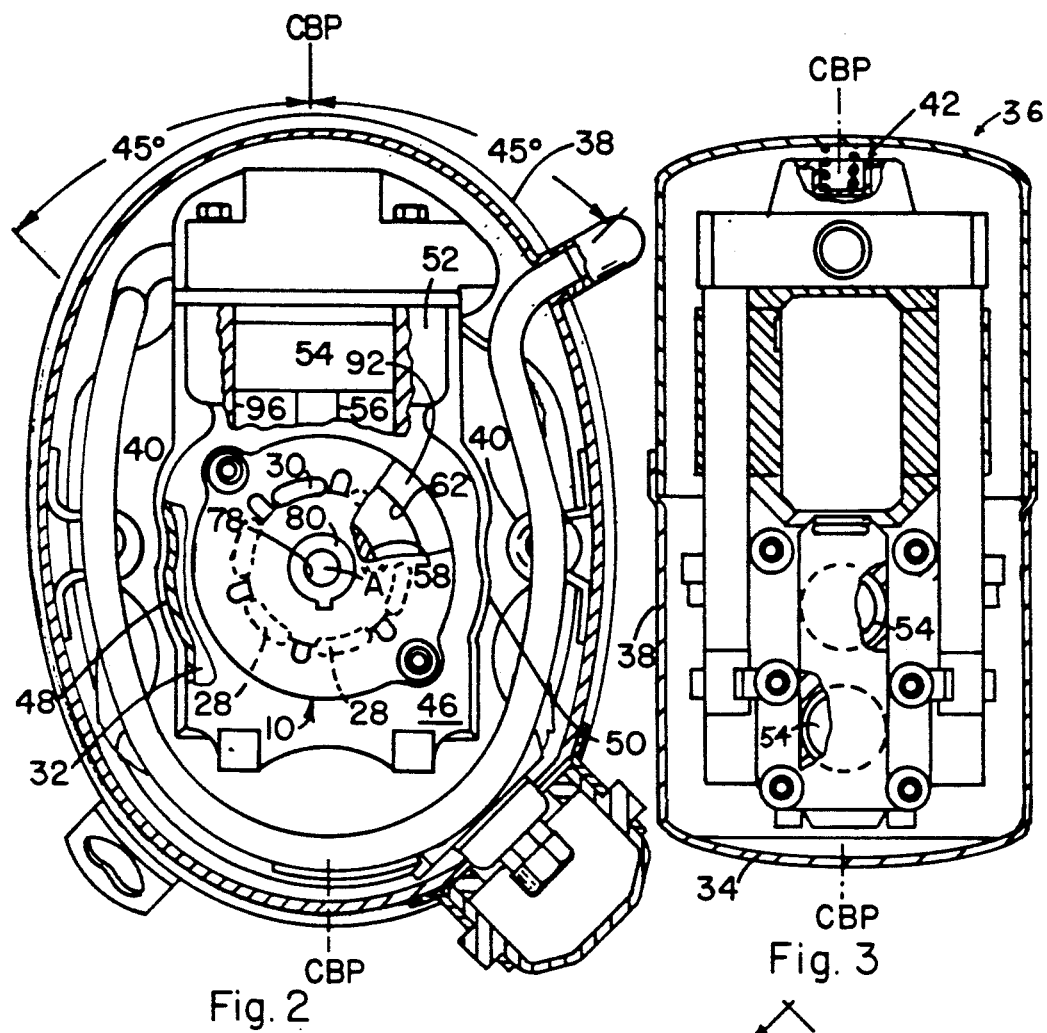
Fig. 2
Fig. 3
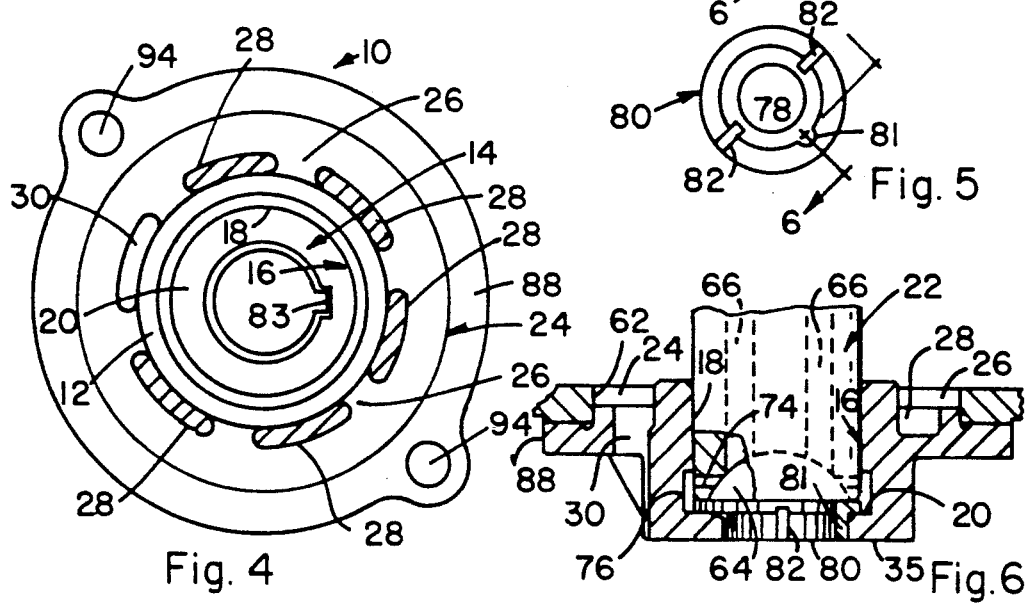
Fig. 4
Fig. 5
Fig. 6

COMPRESSOR CRANKSHAFT BEARING CAP AND ASSEMBLY

FIELD OF INVENTION

This invention concerns novel construction for compressor crankshaft supporting structure in the form of bearing cap means for supporting the crankshafts of piston type compressors such as hermetically sealed units used in refrigerators, heat pumps, window units, or other such applications, and particularly concerns such cap means for use in compressors having substantially vertically oriented crankshafts and multiple pistons.

DESCRIPTION OF RELATED ART

Crankshaft bearings and bearing cap assemblies for piston type gas compressors having substantially vertically oriented crankshafts are shown for example, in U.S. Pat. Nos. 3,104,051; 3,272,426; 3,334,808; 3,807,907; 3,876,339; 4,174,927; 4,518,326; and 4,623,304, the utility and general compressor structure disclosures of which are incorporated herein by reference.

It has been applicant's experience that improvements in such bearing and supporting structures are desirable from the standpoint of reduction in vibration noise generated by general compressor operation, but particularly, vibration transmitted between the crankcase and rapidly moving parts such as the crankshaft-piston-valve train. The particular constructions of such crankshaft supporting structures shown in these prior patents appear to transmit or even magnify such noise to a level which applicant considers excessively high for his applications. Also, many of such prior devices are structurally complex and costly in manufacture and assembly onto the compressor crankcase.

Additionally, and as depicted in the aforementioned patents, the crankshaft supporting structures or end caps are typically positioned in vertical crankshaft compressors such that the recirculating oil necessarily floods the upper surface areas of the caps. As such, the caps, or other contiguous structure can be provided conveniently with structure designed to capture debris and other sediment as illustrated in the aforesaid U.S. Pat. No. 4,174,927. Such structure, however, is neither designed for clarifying the recirculating oil on a permanent basis nor preventing unclarified oil from flooding the bearing area. Consequently, the recirculating compressor oil with entrained debris such as metal particles, polymeric sediment, or the like will eventually reduce, through abrasion and clogging of small oil passages, the longevity of the unit. It is particularly noted that the sump end bearing cap is located in vertical shaft compressors in a most effective position for lubricating the crankshaft thrust and axial or sleeve bearings, however, as aforesaid little if any effort has heretofore been made in designing the cap to minimize contact of these bearings with substantially unclarified oil.

Objects, therefore, of the present invention are: to provide improved crankshaft bearing and bearing support structure, particularly for small hermetically sealed, multi-piston units, while providing markedly enhanced vibration noise damping; and to provide such structure with markedly improved oil lubrication and oil clarification capacity.

SUMMARY OF INVENTION

These and other objects hereinafter appearing have been attained in accordance with the present invention through the discovery of bearing cap means for gas compressors of compressor units in which oil is normally entrained with the refrigerant gas and recirculated therewith, said cap means being adapted for mounting on compressor block means in substantial axial alignment with a crankshaft mounted therein, said cap means comprising body means having cavity means therein formed by wall means providing both axial and lateral shoulder or bearing means for containing the sump end portion of the crankshaft, shelf means on said body means extending generally laterally outwardly therefrom and having face means oriented generally transverse to the axis of said cavity means, pocket means in said face means adapted to catch and retain sediment, and port means extending from said face means through said shelf means and adapted to drain oil from the crankcase to the sump of the compressor.

In certain perferred embodiments:

(a) said pocket means substantially peripherally surrounds said body means;

(b) said body means is provided with flange means having mounting surface means oriented substantially transverse to the axis of said cavity means and adapted to lie against cooperating mounting surface means on the compressor block means;

(c) said flange means is provided with bolt holes for receiving mounting bolts securing said cap to the compressor block means, wherein the position of said holes relative to the position of said port means is such that said cap means can be mounted on the block means with said port means oriented generally toward the cylinder side of the block means;

(d) said pocket means comprises multiple separate but contiguous pockets;

(e) said pocket means and port means are formed arcuately in said face means substantially on a common radius;

(f) the entry area (cross section area) of said port means is from about 1/10 to about ¼ the entry area of said pocket means; and (g) said wall means of said cavity means is radially and peripherally contoured intermediate said axial and lateral shoulder means to provide oil reservoir means in immediate flow communication with both said shoulder means.

BRIEF DESCRIPTION OF THE DRAWINGS

The invention will be understood further from the following description and drawings which vary in scale and wherein:

FIG. 2 is bottom elevation, partly sectioned, of the complete unit taken along line 2—2 of FIG. 1 in the direction of the arrows and rotated clockwise 90 degrees;

FIG. 3 is an elevation, partly sectioned, of the unit of FIG. 2 rotated 90 degrees downwardly forward of the plane of the paper;

FIG. 4 is an elevation of the upper surface of the cap means which faces into the crankcase;

FIG. 5 is an elevation of the bottom or sump side surface of the bearing insert means; and FIG. 6 is a partially sectioned view of the end cap means having the bearing insert means and crankshaft end mounted therein, the view being taken along line 6—6 of FIG. 5 in the direction of the arrows.

DESCRIPTION OF PREFERRED EMBODIMENTS

Figure 1:
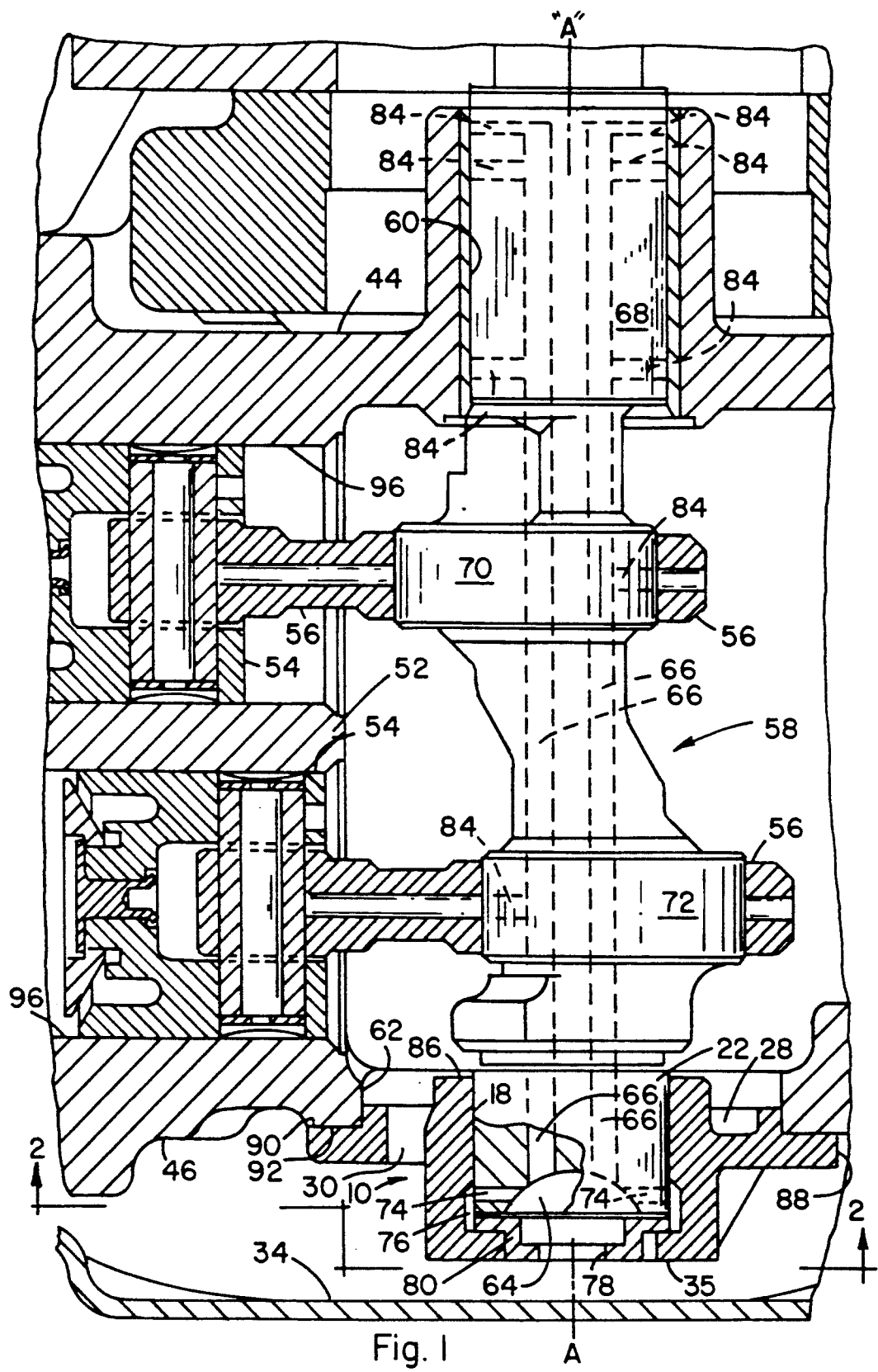
FIG. 1 is a cross-sectional view of portions of a dual cylinder, hermetically sealed compressor unit provided with the present bearing cap means.

Referring to the drawings, the bearing cap means 10 comprises body means 12 having cavity means 14 therein formed by wall means 16 coextensive with and providing both axial and lateral shoulder or bearing means 18 and 20 respectively for containing the sump end portion 22 of the crankshaft, shelf means 24 on said body means extending generally laterally outwardly therefrom and having face means 26, which comprises the entire upper surface of shelf means 24 in the embodiment shown, oriented generally transverse to the axis of said cavity means, pocket means 28 in said face means adapted to catch and retain sediment, and port means 30 extending from said face means through said shelf means and adapted to drain oil from the crankcase 32 to the sump 34 of the compressor unit 36. The terms "generally lateral" and "generally transverse" as used herein means that the shelf or the like can be curved, slanted, undulating or the like provided that the pockets can be formed in face means 26 and retain sediment.

Referring to FIGS. 1-3, the compressor which is shown as dual piston but which may be, e.g., 1-4, preferably, in-line pistons, is mounted in a shell 38, typically by side mounts such as 40 and top mount or retainer such as 42, such mountings being typical in the art, particularly exemplified in the aforesaid U.S. Pat. Nos. 3,334,808; 3,807,907; and 3,876,339. The crankcase 32 is formed by motor and sump end walls, 44 and 46 respectively, side walls 48 and 50, and cylinder block 52, all of which comprise the compressor block means. The side of the crankcase opposite the cylinder block is typically open to the interior of the shell for direct communication with the recirculating liquids or gasses and to provide easy access to the crankcase for assembling pistons 54, connecting rods 56 and crankshaft 58.

Walls 44 and 46 are typically line-bored to provide crankshaft mounting apertures or bores 60 and 62 respectively. Bore 62 is sufficiently large to allow easy insertion of the crankshaft upwardly therethrough. The suction and discharge valving of the compressor may be of any known construction, the particular suction valving shown being of the type shown in U.S. Pat. No. 4,955,796, the disclosure of which is incorporated herein by reference. The crankshaft sump end portion or journal 22 is provided with a recess 64 communicating with siphon conduits 66 extending upwardly therethrough to journal 68 and branching radially through the shaft at strategic locations such as at journals 68, 70, 72 and 22 to pressure feed oil to the connecting rod and wrist pin bearings, and the like. The oil feed branches 74 in journal 22 communicate with a reservoir 76 formed in wall means 16 and preferably completely encircling the journal. The lateral shoulder means 20 of the cap is provided with aperture or oil intake port 78. It is noted that when the bearing insert 80 is employed, port 78 is its axial aperture means, and when it is not used, 78 is the axial aperture in the lateral shoulder means 20.

The use of bearing insert 80 is preferred and the special structure thereof enhances lubrication of journal 22 and its bearing 18. This structure comprises the oil pressure relief passage means or slots 82 communicating with reservoir 76 which is pressure fed oil through branches 74. In operation, the siphoning effect of conduits 66 and their generally laterally oriented branches 74 and 84 suck oil from sump 34, the oil level in which is typically at least up to the bottom 35 of body means 12, and inject it into reservoir 76 from which it is forced upwardly between journal 22 and bearing 18 and emitted at the top 86 of body means 12. This oil flow pattern prevents essentially all non-clarified recirculating lubricating oil from directly contacting bearing 18 in that most of the oil draining through port 30 to the sump will have first contacted pockets 28, rather than bearing 18, and left significant amounts of its sediment therein. In order to prevent excessive pressure and sediment buildup in reservoir 76, slot 82 is provided to drain directly to the sump and, in effect, provide an oil recirculating and pressure regulating system for the reservoir. Insert 80 is provided with a keying nib 81 which fits into keying notch 83 in shoulder means 20 to prevent rotation of the insert with the crankshaft.

The number, size and arrangement of pockets 28 and port means 30 can be varied. For example, the pockets may comprise a single recess, but, several pockets are preferred in order to minimize washing of the sediment out of the pocket means by the recirculating oil. In order to assure adequate access of the oil to the pocket means, the single or multiple pocket means should at least substantially surround cap body means 12, i.e., at least about 270 degrees therearound, and the ratio of the total entry area in $cm^2$ of the pocket means, i.e., the total area in $cm^2$ of the shaded portions of the pockets in FIG. 4, to the total weight in pounds of oil being recirculated through the compressor unit per hour under normal running conditions is preferably from about 1.5 to about 4.5, and most preferably from about 2.0 to about 4.0. Also, it is preferred that the ratio of the total volumetric capacity of said pocket means in $cm^3$ to the weight in pounds of initial oil charge to the compressor unit preferably ranges from about 0.5 to about 1.8, and most preferably from about 0.9 to about 1.3.

The bearing cap is provided with flange means 88 having annular mounting surface 90 adapted to smoothly contact annular mounting surface 92 on wall 46 for bolting thereto through holes 94 in the flange.

A most fortuitous effect of the present cap means residues in the unexpected reduction in vibration noise resulting from the positioning of the cap means on the crankcase such that the port means 30 lies generally toward the cylinders 96 of the compressor. It has been found that when port means 30 is thus positioned, or preferably within about 45 degrees, as shown by the dotted angle lines in FIG. 2, or most preferably within about 30 degrees on either side of the cylinder bank plane "CBP", with the shaft axis "A" as the angle point, the vibration noise level, dBA, which generally is about 70 or above, is reduced to about 67 or below, i.e., a reduction of about 50%.

This invention has been described in detail with particular reference to preferred embodiments thereof, but it will be understood that variations and modifications will be effected within the spirit and scope of the invention.

I claim:

1. Bearing cap means for a gas compressor of a compressor unit in which oil is normally entrained with refrigerant gas and recirculated therewith, the compressor having block means formed to provide crankcase means, and the compressor unit having shell means containing said compressor and providing oil sump means therefor, said cap means being adapted for mounting on the compressor block means in substantial axial alignment with a crankshaft mounted therein, said cap means comprising body means having cavity means therein formed by wall means providing both axial and lateral shoulder means for containing a sump end portion of a crankshaft, shelf means on said body means extending generally laterally outwardly therefrom and having face means oriented generally transverse to the axis of said cavity means, pocket means in said face means adapted to catch and retain sediment, said pocket means being arranged substantially surrounding said body means of said cap means, and port means extending from said face means through said shelf means and adapted to drain oil from the crankcase means to the sump of the compressor unit, and wherein the entry area of said port means is from about 1/10 to about ¼ of the total entry area of said pocket means.

2. The cap means of claim 1 wherein said pocket means are formed into said face means to a depth of less than about one half the thickness of said shelf means.

3. The cap means of claim 1 wherein said cap means is provided with flange means located peripherally outwardly of said shelf means and integral with and having mounting surface means oriented substantially transverse to the axis of said cavity means and adapted to lie against cooperating mounting surface means on the compressor block means.

4. The cap means of claim 3 wherein said flange means is provided with bolt holes for receiving mounting bolts securing said cap to compressor block means, wherein the position of said holes relative to the position of said port means is such that said cap means can be mounted on said block means with said port means oriented generally toward a cylinder side of said block means.

5. The cap means of claim 2 wherein said pocket means comprises multiple separate but contiguous pockets.

6. The cap means of claim 5 wherein said pocket means and port means are formed arcuately in said face means substantially on a common radius.

7. The cap means of claim 6 wherein an entry area of said port means is from about 1/10 to about ¼ of the total entry area of said pocket means.

8. The cap means of claim 1 wherein said wall means of said cavity means is radially and peripherally contoured intermediate said axial and lateral shoulder means to provide oil reservoir means in immediate flow communication with both said shoulder means.

9. The cap means of claim 8 wherein said lateral shoulder means is formed with generally axial aperture means.

10. The cap means of claim 1 wherein said body means is provided with first keying means adapted to abut cooperating second keying means on thrust bearing insert means positioned within said cavity means and supported on said lateral shoulder means.

11. The cap means of claim 10 wherein first keying means is provided on said lateral shoulder means adjacent said aperture means therethrough.

12. A gas compressor having block means providing crankcase means and cylinder means and having crankshaft bore means extending through generally opposing motor end wall means and sump end wall means thereof, crankshaft means mounted through said bore means, piston means mounted in said cylinder means and connected onto said crankshaft means, bearing cap means mounted on said sump end wall means, said cap means comprising body means having cavity means therein formed by wall means providing both axial and lateral shoulder means containing the sump end portion of said crankshaft means, shelf means on said body means extending generally laterally outwardly therefrom and having face means oriented generally transverse to the axis of said cavity means and facing into said crankcase means, pocket means formed in said face means and adapted to catch and retain sediment, said pocket means being arranged substantially surrounding said body means of said cap means, and port means adjacent said pocket means and extending through said shelf means for draining oil from said crankcase means to the sump of a compressor unit in which said compressor is mounted, and wherein the entry area of said port means is from about 1/10 to about ¼ of the total entry area of said pocket means.

13. The compressor of claim 12 wherein said pocket means are formed into said face means to a depth of less than about one half the thickness of said shelf means.

14. The compressor of claim 12 wherein said cap means is provided with flange means located peripherally outwardly of said shelf means and integral therewith and having mounting surface means oriented substantially transverse to the axis of said cavity means and affixed against cooperating mounting surface means on said sump end wall means.

15. The compressor of claim 12 wherein said pocket means comprises multiple separate but contiguous pockets.

16. The compressor of claim 15 wherein said pocket means and port means are formed arcuately in said face means substantially on a common radius.

17. The compressor of claim 16 wherein said port means occupies from about 1/10 to about ¼ of the total surface area of said face means which is occupied by said pocket means.

18. The compressor of claim 12 mounted in a shell of a compressor unit, wherein the ratio of the total volumetric capacity of said pocket means in $cm^3$ to the weight in pounds of initial oil charge to the compressor unit ranges from about 0.5 to about 1.8.

19. The compressor of any one of claims 12 through 18 wherein said port means is oriented generally toward a cylinder side of said block means.

20. The compressor of claim 12 wherein said cylinder means comprises dual cylinders and said port means is substantially aligned with a cylinder bank plane.

21. The compressor of claim 20 wherein thrust bearing insert means is provided in said cavity means and supported on said lateral shoulder means, the said sump end of said crankshaft means is rotatably supported on said insert means, and generally axial aperture means are provided through said lateral shoulder means and said bearing insert means.

22. The compressor of claim 21 wherein said wall means of said cavity means is radially and peripherally formed intermediate said axial and lateral shoulder means to provide oil reservoir means in immediate flow communication with both said shoulder means.

23. The compressor of claim 22 wherein said bearing insert means is provided with oil passage means communicating with said oil reservoir means and adapted to fluid connect a same with the sump of a compressor unit.

24. The compressor of claim 12 mounted substantially vertically in a shell of a compressor unit.

25. The compressor of claim 23 mounted substantially vertically in a shell of a compressor unit.

26. The compressor of claim 12 wherein the ratio of the total entry area in cm$^2$ of the pocket means to the total weight in pounds of oil being recirculated through the compressor unit per hour under normal running conditions is from about 1.5 to about 4.5.

27. The compressor of claim 12 wherein the ratio of the total volumetric capacity of said pocket means in cm$^3$ to the weight in pounds of initial oil charge to the compressor unit ranges from about 0.5 to about 1.8.

* * * * *